US012674515B2

(12) United States Patent
Feng et al.

(10) Patent No.: US 12,674,515 B2
(45) Date of Patent: Jul. 7, 2026

(54) FOUR-WAY VALVE AND AIR CONDITIONING SYSTEM PROVIDED WITH SAME

(71) Applicant: ZHEJIANG DUNAN ARTIFICIAL ENVIRONMENT CO., LTD., Shaoxing (CN)

(72) Inventors: Zhongbo Feng, Shaoxing (CN); Yongbin Xuan, Shaoxing (CN); Zhehang Chen, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 4 days.

(21) Appl. No.: 18/542,618

(22) Filed: Dec. 16, 2023

(65) Prior Publication Data

US 2024/0117886 A1      Apr. 11, 2024

Related U.S. Application Data

(63) Continuation of application No. PCT/CN2022/097868, filed on Jun. 9, 2022.

(30) Foreign Application Priority Data

Jun. 17, 2021    (CN) .......................... 202110672202.0

(51) Int. Cl.
*F16K 11/085* (2006.01)
*F25B 41/26* (2021.01)

(52) U.S. Cl.
CPC .......... *F16K 11/0853* (2013.01); *F25B 41/26* (2021.01); *F25B 2313/02741* (2013.01)

(58) Field of Classification Search
CPC .... F16K 11/0853; F16K 5/0478; F16K 5/188; F16K 5/0457; F25B 41/26; F25B 2313/02741; F25B 13/00
USPC ............................. 251/175, 192; 137/625.23
See application file for complete search history.

(56) References Cited

U.S. PATENT DOCUMENTS

| | | | | | |
|---|---|---|---|---|---|
| 465,670 | A | * | 12/1891 | Le Mieux | ............... F16K 3/188 |
| | | | | | 251/175 |
| 2,703,586 | A | * | 3/1955 | Asker | ..................... F16K 1/228 |
| | | | | | 251/182 |

(Continued)

FOREIGN PATENT DOCUMENTS

| | | |
|---|---|---|
| CN | 1098487 A | 2/1995 |
| CN | 200982443 Y | 11/2007 |

(Continued)

OTHER PUBLICATIONS

Dictionary Definition for "Affix" from Merriam-Webster Online (Accessed: Mar. 14, 2025) (Available Online: https://www.merriam-webster.com/dictionary/affixed) (Year: 2025).*

(Continued)

*Primary Examiner* — Craig M Schneider
*Assistant Examiner* — Andrew J Rost

(57) ABSTRACT

A four-way valve and an air conditioning system provided with same are provided. The four-way valve includes a valve body, a piston and a sealing member. The valve body is provided with a valve cavity. The piston is movably disposed in the valve cavity. The sealing member is disposed on the piston and at least a part of the sealing member fits against an inner wall of the valve cavity. The valve cavity is separated into a high-pressure chamber and a low-pressure chamber by the piston. The piston is provided with an air passage structure which is in communication with the sealing member, and the air passage structure is in communication with the high-pressure chamber. A medium in the high-pressure chamber is in contact with the sealing element through the air passage structure.

5 Claims, 6 Drawing Sheets

(56) References Cited

U.S. PATENT DOCUMENTS

| | | | | | |
|---|---|---|---|---|---|
| 3,191,628 | A | * | 6/1965 | Kirkwood | F16K 11/0853 |
| | | | | | 137/625.23 |
| 3,861,420 | A | * | 1/1975 | Lloyd | F16K 5/0407 |
| | | | | | 137/625.23 |
| 5,988,219 | A | * | 11/1999 | Larsen | F16K 11/0853 |
| | | | | | 137/625.46 |
| 10,975,974 | B2 | | 4/2021 | Zhu | |
| 2018/0328635 | A1 | * | 11/2018 | Tashiro | F25B 47/02 |
| 2020/0132202 | A1 | | 4/2020 | Kaufman et al. | |

FOREIGN PATENT DOCUMENTS

| | | | |
|---|---|---|---|
| CN | 104121391 | A | 10/2014 |
| CN | 104676048 | A | 6/2015 |
| CN | 205841841 | U | 12/2016 |
| CN | 110094534 | A | 8/2019 |
| CN | 210531636 | U | 5/2020 |
| CN | 211599622 | U | 9/2020 |
| CN | 213064737 | U | 4/2021 |
| CN | 215257974 | U | 12/2021 |
| KR | 20010065565 | A | 7/2001 |

OTHER PUBLICATIONS

International Search Report of PCT/CN2022/097868, Dated: Sep. 20, 2022.
European search report of EP22824118.8, Dated: Sep. 12, 2024.
Notice of first review opinion of 202110672202.0, Dated: Nov. 29, 2024.

\* cited by examiner

FOUR-WAY VALVE AND AIR CONDITIONING SYSTEM PROVIDED WITH SAME

CROSS-REFERENCE TO RELATED APPLICATIONS

This application is a continuation of international patent application No. PCT/CN2022/097868, filed on Jun. 9, 2022, which itself claims priority to Chinese patent application No. 202110672202.0, filed on Jun. 17, 2021, and titled "FOUR-WAY VALVE AND AIR CONDITIONING SYSTEM PROVIDED WITH SAME". The content of the above identified application is hereby incorporated herein in their entireties by reference.

TECHNICAL FIELD

The present disclosure relates to the field of refrigeration technology, and in particular, to a four-way valve and an air conditioning system provided with same.

BACKGROUND

At present, a large-capacity cross electromagnetic four-way directional valve usually uses a piston to provide a reversing function. Specifically, a piston rotates in a valve body to realize a reversing function. During an operation of the electromagnetic four-way reversing valve, to avoid internal leakage between a high-pressure side and a low-pressure side, a high-precision clearance fit is generally adopted between the piston and the valve body.

In the related art, an elastic member of the four-way valve cannot effectively and quickly ensure a rebound of a sealing element, so that the sealing element cannot fit tightly against an inner wall of the valve body, which increases a risk of internal leakage, thus affecting a normal use of the four-way valve.

SUMMARY

According to various embodiments of the present disclosure, a four-way valve is provided. The four-way valve includes a valve body, a piston and a sealing member. The valve body is provided with a valve cavity. The piston is movably disposed in the valve cavity. The sealing member is disposed on the piston and at least a part of the sealing member can abut against an inner wall of the valve cavity. The valve cavity is separated into a high-pressure chamber and a low-pressure chamber by the piston. The high-pressure chamber and the low-pressure chamber are mutually independent. The piston is provided with an air passage structure. One end of the air passage structure is in communication with the sealing member and the other end of the air passage structure is in communication with the high-pressure chamber. A high-pressure medium in the high-pressure chamber is capable of pressing the sealing member against the inner wall of the valve cavity through the air passage structure.

In some embodiments, the piston is provided with two air passage structures, the four-way valve includes two sealing members, the two sealing members are symmetrically provided on both sides of the piston, and the two air passage structures are respectively in communication with the two sealing members and symmetrically provided on both sides of the piston relative to an axial direction of the piston.

In some embodiments, the two air passage structures are separated from each other on both sides of the piston, and the high-pressure medium in the high-pressure chamber are capable of pressing each of the two sealing members against the inner wall of the valve cavity through each of the two air passage structures, respectively.

In some embodiments, each of the two air passage structures includes a first air passage and a second air passage in communication with each other. The first air passage and the second air passage are disposed at an angle. One end of the first air passage is in communication with the second air passage and the other end of the first air passage is in communication with the high-pressure chamber. One end of the second air passage is in communication with the first air passage and the other end of the second air passage is in communication with the two sealing members correspondingly.

In some embodiments, each of the two air passage structures includes a first air passage, a gap is respectively formed between each of the two sealing members and the piston, the gap extends in an axial direction of the valve body, and the first air passage is in communication with the gap.

In some embodiments, the piston is provided with two air passage structures in communication with each other and disposed on both sides of the piston, and the high-pressure medium in the high-pressure chamber is in contact with the sealing member through the air passage structure.

In some embodiments, each of the two air passage structures includes a first air passage and a second air passage, one end of the first air passage is in communication with the second air passage and the other end of the first air passage is in communication with the high-pressure chamber, and both ends of the second air passage are connected to the two sealing members on both sides of the piston.

In some embodiments, each of the two air passage structures includes a first air passage, two gaps are formed between the piston and the two sealing members on both sides of the piston correspondingly, the gap extends in an axial direction of the valve body, and two ends of the first air passage are respectively in communication with the two gaps.

In some embodiments, a mounting groove is provided on both sides of the piston and the sealing member is movably disposed in the mounting groove.

In some embodiments, an elastic member is provided between the sealing member and the piston, the elastic member is disposed within the mounting groove, and the elastic member is capable of providing a resilient force to the sealing member for movement toward an inner wall of the valve body.

The present disclosure further provides an air conditioning system. An air conditioning system includes a compressor and a four-way valve. The compressor is connected to the four-way valve.

Details of one or more embodiments of this application are presented in the attached drawings and descriptions below. And other features, purposes and advantages of this application will become apparent from the description, drawings and claims.

BRIEF DESCRIPTION OF THE DRAWINGS

For a better description and illustration of embodiments and/or examples of those inventions disclosed herein, reference may be made to one or more attached drawings. Additional details or examples used to describe the drawings should not be considered as limiting the scope of any of the disclosed inventions, currently described embodiments and/ or examples, and currently understood best modes of these inventions.

Figure 1:
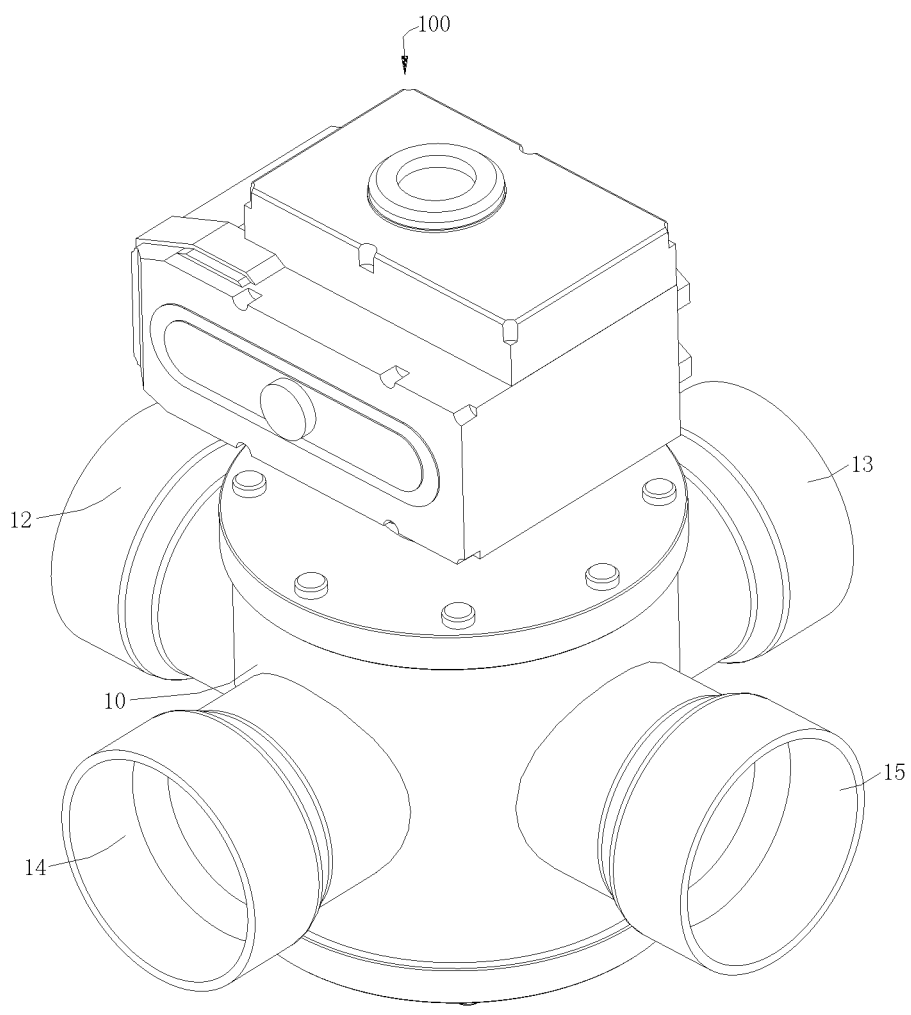
FIG. 1 is a schematic view of a four-way valve according to one or more embodiments.

Reference signs are as follows:

100 represents a four-way valve; 10 represents a valve body; 11 represents a valve cavity; 111 represents a high-pressure chamber; 112 represents a low-pressure chamber; 12 represents a first valve pipe; 13 represents a second valve pipe; 14 represents a third valve pipe; 15 represents a fourth valve pipe; 20 represents a piston; 21 represents an air passage structure; 211 represents a first air passage; 212 represents a second air passage; 22 represents a gap; 23 represents a mounting groove; 30 represents a sealing member, 40 represents an elastic member; 200 represents a compressor; and 300 represents an air conditioning system.

DETAILED DESCRIPTION

The technical scheme in the embodiment of this application will be described clearly and completely with the attached drawings. Obviously, the described embodiment is only a part of the embodiment of this application, not the whole embodiment. Based on the embodiments in this application, all other embodiments obtained by ordinary technicians in this field without creative work belong to the protection scope of this application.

It should be noted that when a component is said to be "mounted" on another component, it can be directly on the other component or there can be a component in the middle. When a component is considered to be "set on" another component, it can be directly set on another component or there may be intervening components at the same time. When a component is considered to be "fixed" to another component, it can be directly fixed to another component or there may be intervening components at the same time.

Unless otherwise defined, all technical and scientific terms used herein have the same meaning as commonly understood by those skilled in the technical field of this application. The terminology used herein in the specification of this application is only for the purpose of describing specific embodiments, and is not intended to limit this application. As used herein, the term "or/and" includes any and all combinations of one or more related listed items.

Referring to FIG. 1 to FIG. 6, the present disclosure provides a four-way valve 100. The four-way valve 100 is applied in an air conditioning system 300, and a cooling mode, a heating mode and a defrosting mode are switched by switching a circulation path of the medium. In this embodiment, the four-way valve 100 adopts a large-capacity cross four-way valve, and in other embodiments, the four-way valve 100 can also be other types of four-way valves.

In the related art, an elastic part of the four-way valve can't effectively and quickly ensure a rebound of a sealing element, so that the sealing element cannot fit tightly against an inner wall of the valve body, which increases a risk of internal leakage, thus affecting a normal use of the four-way valve.

In order to solve a problem that the sealing element in the related four-way valve can not closely adhere to the inner wall of the valve body, resulting in internal leakage. The present disclosure provides a four-way valve 100. The four-way valve 100 includes a valve body 10, a piston 20 and a sealing member 30. The valve body 10 is provided with a valve cavity 11. The piston 20 is movably disposed in the valve cavity 11. The sealing member 30 is disposed on the piston 20 and at least a part of the sealing member 30 can abut against an inner wall of the valve cavity 11. The valve cavity 11 is separated into a high-pressure chamber 111 and a low-pressure chamber 112 by the piston 20. The high-pressure chamber 111 and the low-pressure chamber 112 are mutually independent. The piston 20 is provided with an air passage structure 21, and one end of the air passage structure 21 is in communication with the sealing member 30 and the other end of the air passage structure 21 is in communication with the high-pressure chamber 111, and a high-pressure medium in the high-pressure chamber 111 is capable of pressing the sealing member 30 against the inner wall of the valve cavity 11 through the air passage structure 21.

In this embodiment, the air passage structure 21 in communicating with the sealing member 30 is provided on the piston 20 adjacent to the high-pressure chamber 111, therefore, the high-pressure medium in the high-pressure chamber 111 is in contact with the sealing member 30 through the air passage structure 21, thereby providing the pressure for the sealing member 30 to attach to the valve body 10, reducing the leakage channel and improving the sealing performance.

Referring to FIG. 1, the four-way valve 100 further includes a first valve pipe 12, a second valve pipe 13, a third valve pipe 14 and a fourth valve pipe 15. The first valve pipe 12, the second valve pipe 13, the third valve pipe 14 and the fourth valve pipe 15 are all arranged on the outer surface of the valve body 10 and are all in communication with the valve cavity 11. All of the first valve pipe 12, the second valve pipe 13, the third valve pipe 14 and the fourth valve pipe 15 are configured to be in communication with the four-way valve 100 with a pipeline in an air conditioning system 300, so that a medium can flow into/out of the four-way valve 100, thus realizing the commutation of the four-way valve 100.

Specifically, during the rotation of the piston 20 relative to the valve body 10, when the first valve pipe 12 is in communication with the second valve pipe 13, the sealing member 30 on one side of the piston 20 is located between the first valve pipe 12 and the third valve pipe 14, and the sealing member 30 on the other side of the piston 20 is located between the second valve pipe 13 and the fourth valve pipe 15. When the first valve pipe 12 is in communication with the third valve pipe 14, the sealing member 30 on one side of the piston 20 is located between the first valve pipe 12 and the second valve pipe 13, and the sealing member 30 on the other side of the piston 20 is located between the third valve pipe 14 and the fourth valve pipe 15.

In this embodiment, the first valve pipe 12 is connected to an air inlet of the compressor 200, the second valve pipe 13 is connected to a condenser, the third valve pipe 14 is connected to a evaporator, and the fourth valve pipe 15 is connected to an air outlet of the compressor 200. Furthermore, when the four-way valve is commutated, the second valve pipe 13 is connected to the evaporator, and the third valve pipe 14 is connected to the condenser. When the first valve pipe 12 is in communication with the second valve pipe 13 and the third valve pipe 14 is in communication with the fourth valve pipe 15, a space formed by the first valve pipe 12 and the second valve pipe 13 in the valve cavity 11 is regarded as the low-pressure chamber 112. A space formed by the third valve pipe 14 and the fourth valve pipe 15 in the valve cavity 11 is regarded as the high-pressure chamber 111. When the first valve pipe 12 is in communication with the third valve pipe 14 and the second valve pipe 13 is in communication with the fourth valve pipe 15, a space formed by the first valve pipe 12 and the third valve pipe 14 in the valve cavity 11 is regarded as the low-pressure chamber 112. A space formed by the second valve pipe 13 and the fourth valve pipe 15 in the valve cavity 11 is regarded as the high-pressure chamber 111. Of course, in other embodiments, a position where each valve pipe is connected with a pipeline in the air conditioning system 300 can be adjusted accordingly according to a specific situation, which is not limited here.

Furthermore, the valve body 10 has a cylindrical shape as a whole, and correspondingly, the piston 20 has a cylindrical structure that can rotate around its axial direction. In some embodiments, both ends of the piston 20 are disc-shaped and can be tightly matched with a cylindrical inner wall of the valve body 10. A middle of the piston 20 is a long plate, and two ends of the long plate are connected with the disks on both sides respectively. The piston 20 can rotate around an axial direction of the valve body 10 in the valve cavity 11, and a flow direction of the medium is changed with the rotation of the piston 20.

In other embodiments, the valve body 10 is not limited to be cylindrical, the two ends of the piston 20 are not limited to be circular, and the middle of the piston 20 is not limited to be a long plate. The shapes of the valve body 10 and the piston 20 can be adjusted according to different situations, and are not limited here.

Figure 2:
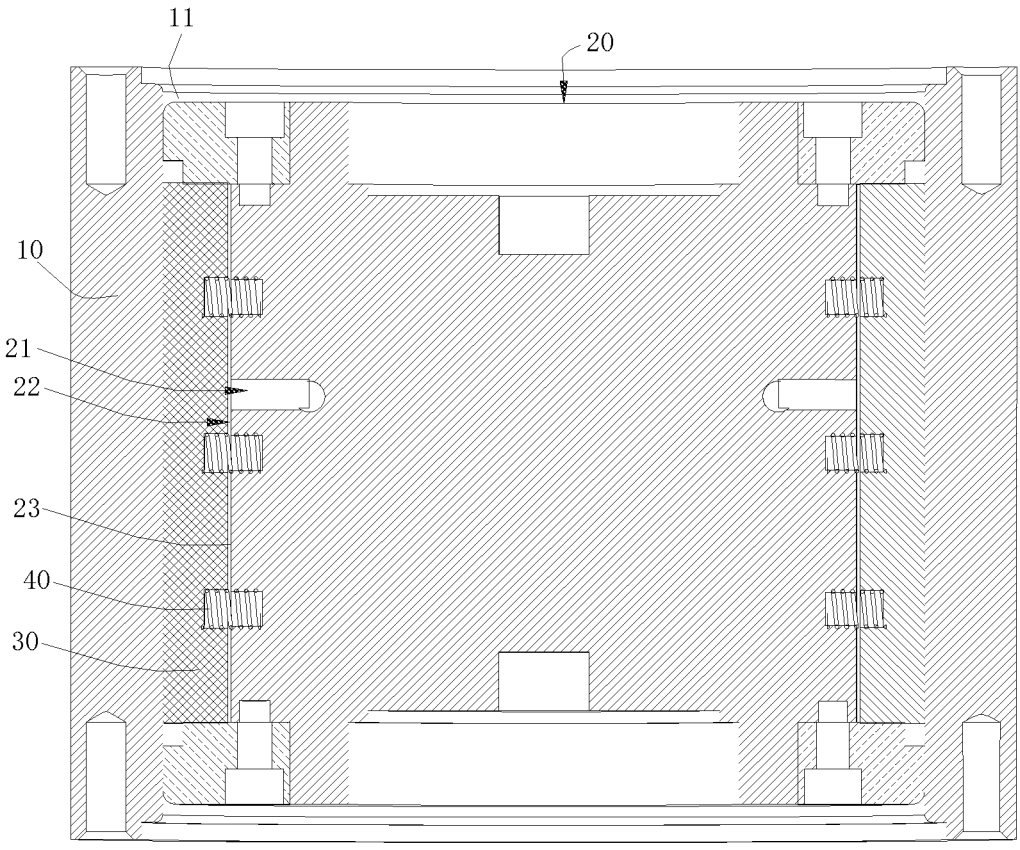
FIG. 2 is a sectional view of a four-way valve according to one or more embodiments.

Referring to FIG. 2, a mounting groove 23 is provided on both sides of the piston 20. And the mounting groove 23 extends along an axial direction of the piston 20. The sealing member 30 is movably disposed in the mounting groove 23. The sealing member 30 is configured to seal off a communication between the media in the high-pressure chamber 111 and the low-pressure chamber 112 to realize the leakage control in the four-way valve 100.

In this embodiment, two sealing members 30 are symmetrically arranged on both sides of the piston 20 with respect to the axial direction of the piston 20. Of course, in other embodiments, the number of the sealing members 30 can be three, four, five or even more as required, as long as the sealing function can be achieved, and the number of the sealing members 30 is not limited here.

Furthermore, the sealing member 30 has a long strip shape, and a length of the sealing member 30 is consistent with a length of the piston 20. In detail, the length of the sealing member 30 is provided to ensure that the sealing member 30 can fully seal the medium. Thus, a normal use of the four-way valve 100 is assured and it can further prevent the medium leakage in the four-way valve 100. In other embodiments, the sealing member 30 can be in a cylindrical shape and in other shapes, which is not limited here.

In this embodiment, in order to make the sealing member 30 have better rigidity, the sealing member 30 is generally made of a material with a certain sealing function (such as rubber material), a certain rigidity, a certain strength and wear resistance. Of course, a metal material with a soft hardness, such as copper or aluminum, can also be selected, which is not limited here.

Furthermore, an elastic member 40 is provided between the sealing member 30 and the piston 20. The elastic member 40 is disposed within the mounting groove 23, and the elastic member 40 is capable of providing a resilient force to the sealing member 30 for movement toward an inner wall of the valve body 10. The elastic force provided by the elastic member 40 can make the inner wall of the sealing member 30 and the valve body 10 fit tightly against each other. On the one hand, the sealing performance is further improved, the medium leakage in the four-way valve 100 is avoided, and the use reliability of the sealing member 30 is improved. On the other hand, the requirement for a gap 22 between the piston 20 and the inner wall of the valve body 10 is also reduced, and the deformation of the valve body 10 is prevented from locking the piston 20.

In this embodiment, the elastic member 40 is a spring, and the number of the elastic member 40 is plural. This arrangement can reduce a processing cost of the elastic member 40, and further decrease the overall processing cost of the four-way valve 100. At the same time, the elastic member 40 protrudes toward a groove wall of the mounting groove 23, and both ends of the elastic member 40 are in contact with the sealing member 30 and the piston 20 respectively, and an elastic force is applied to the sealing member 30 so that the sealing member 30 is attached to the inner cavity wall of the valve cavity 11. In other embodiments, the elastic member 40 can also be provided with other elastic structures such as elastic wiper blades, which is not limited here.

Furthermore, the piston 20 is provided with two air passage structures 21, the two sealing members 30 are symmetrically provided on both sides of the piston 20, and the two air passage structures 21 are respectively in communication with the two sealing members 30 and symmetrically provided on both sides of the piston 20 relative to an axial direction of the piston 20. The two air passage structures 21 are symmetrically provided on both sides of the piston 20, so that the pressure on both sides of the piston 20 is balanced, and stress concentration caused by pressure imbalance is avoided.

It should be noted that the two air passage structures 21 may be in communication with each other, or may not be in communication with each other. When the two air passage structures 21 are not in communication with each other, both of the two air passage structures 21 are in communication with the high-pressure chamber 111. And the two air passage structure 21 are respectively in communication with the sealing member 30 correspondingly arranged on both sides of the piston 20, so that a pressure on both sides of the piston 20 is balanced and stress concentration caused by pressure imbalance is avoided. When the two air passage structures 21 are in communication with each other, the medium in the high-pressure chamber is in contact with the sealing element through the air passage structures 21, so that a pressure on both sides of the piston 20 is balanced and stress concentration caused by pressure imbalance is avoided. Alternatively, in some embodiments, the two first air passages 211 of the two air passage structures 21 is in communication with each other. Alternatively, in other embodiments, the two second air passages 212 of the two air passage structures 21 are in communication with each other. In other embodiments, the two first air passages 211 and the two second air passages 212 of the two air passage structures 21 are respectively in communication with each other, which is not limited in this application.

Embodiment 1

Figure 3:
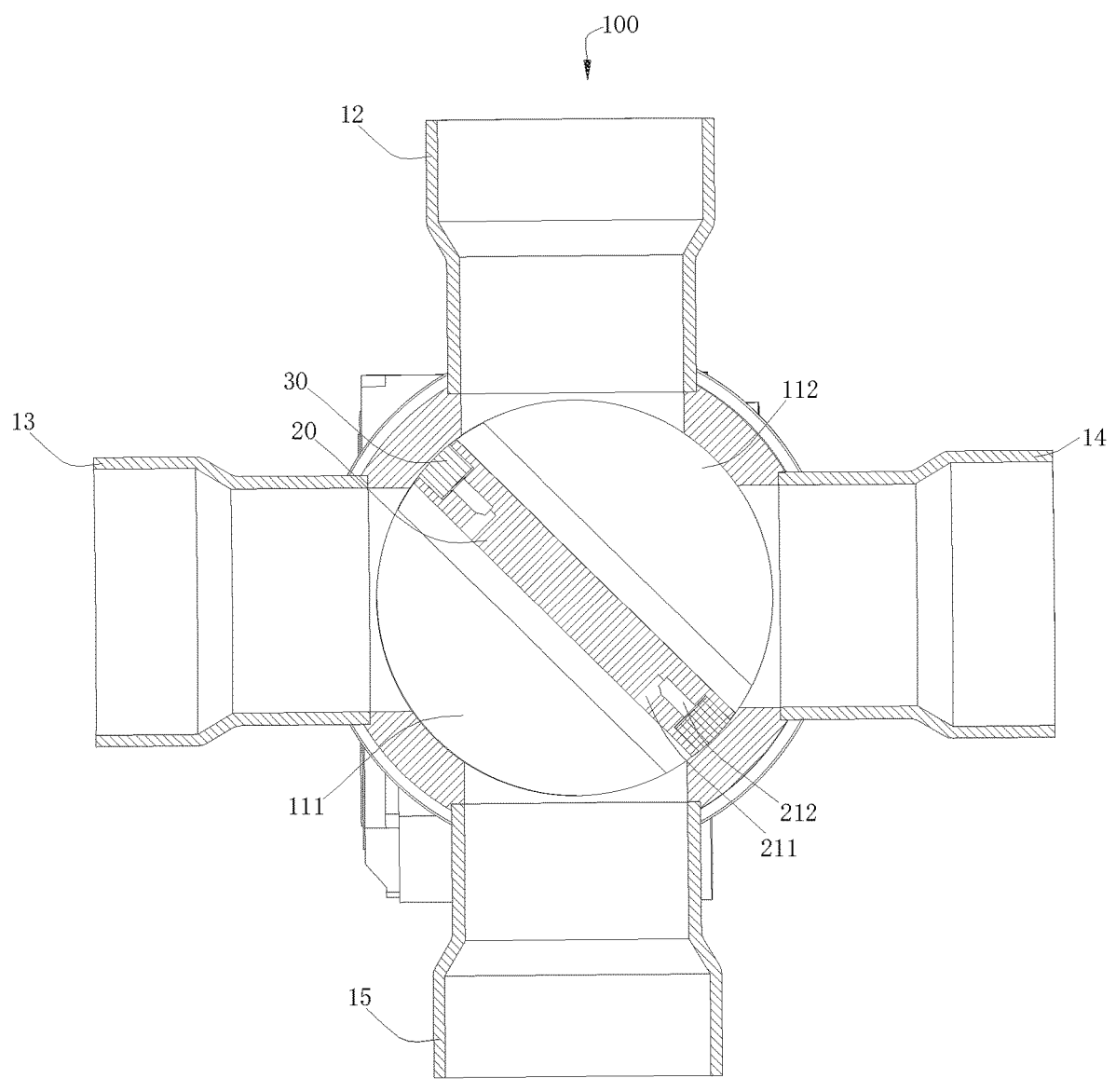
FIG. 3 is a schematic view of an air passage structure according to one or more embodiments.

Referring to FIG. 3, a four-way valve is provided. Two air passage structures 21 are separated from each other on both sides of the piston 20. Each of the two air passage structures 21 includes a first air passage 211 and a second air passage 212, and the two air passage structures 21 are independent of each other, that is, the two air passage structures 21 cannot be in communication with each other. The first air passage 211 and the second air passage 212 are both arranged in a direction perpendicular to an axial direction of the piston 20, and there is an included angle between the arrangement direction of the first air passage 211 and the arrangement direction of the second air passage 212. One end of the first air passage 211 is in communication with the second air passage 212, and the other end of the first air passage 211 is in communication with a high-pressure chamber 111. One end of the second air passage 212 is in communication with the first air passage 211 and the other end of the second air passage 212 is in communication with the sealing member 30.

Although the two air passage structures 21 are provided on both sides of the piston 20 at intervals, they are all located on a side of the piston 20 adjacent to the high-pressure chamber 111, that is, both of the air passage structures 21 are in communication with the high-pressure chamber 111.

Alternatively, the first air passage 211 and the second air passage 212 are perpendicular to each other. In this way, the second air passage 212 is arranged perpendicular to an axial direction of the sealing member 30, so as to apply a vertical force to the sealing member 30, so that the sealing member 30 can better be in contact with an inner wall of the valve body 10, and a problem of uneven stress will not be caused. Of course, in other embodiments, an angle between the first air passage 211 and the second air passage 212 can be set at other angles such as 30 degrees, 60 degrees or other degrees, which is not limited here.

Specifically, a high-pressure medium in the high-pressure chamber 111 can enter the second air passage 212 through the first air passage 211 on both sides of the piston 20. In a process that the high-pressure medium flows in the radial direction of the piston 20 through the first air passage 211 and then flows into the second air passage 212 from the first air passage 211, because there is a right angle between the arrangement direction of the first air passage 211 and the arrangement direction of the second air passage 212, the high-pressure medium will turn 90 degrees in the first air passage 211 and enter into the second air passage 212. Since a force pressing the sealing member 30 toward the inner wall of the valve body 10 is the largest in the vertical direction, the second air passage 212 is provided in the vertical direction toward the sealing member 30, it makes the high-pressure medium exert a vertical force on the sealing member 30 in a process of flowing from the second air passage 212 to the sealing member 30. At this time, the sealing member 30 on the other side of the piston 20 is also applied with the same vertical force, so that the sealing member 30 can be in contact with the inner wall of the valve body 10 by the high-pressure medium, and at the same time, the pressure on the sealing member 30 on both sides of the piston 20 can be equalized, which can not only prevent internal leakage, but also avoid a problem of stress concentration.

It should be noted that, in order to facilitate understanding of a specific conditions of a pressure borne by the high-pressure medium in the first air passage 211 and the second air passage 212, it is assumed that the pressure borne by the high-pressure medium in the high-pressure chamber 111 is denoted as P1. After the high-pressure medium enters the first air passage 211, the pressure of the high-pressure medium in the first air passage 211 is equal to that of the high-pressure chamber 111, so it is also P1. When the medium turns into the second air passage 212 through the first air passage 211, because there is an inflection point between the first air passage 211 and the second air passage 212, therefore, when the high-pressure medium is transferred from the first air passage 211 to the second air passage 212 and passes through the inflection point, some pressure loss will occur, and then the pressure borne by the high-pressure medium in the second air passage 212 will change from P1 to P2. Because the sealing member 30 faces the inner wall of the valve body 10, referring to a principle of interaction, there will also be a reactive pressing force on the sealing member 30 from the inner wall of the valve body 10, which is denoted as P3. Correspondingly, it is assumed that a pressure of a low-pressure medium in the low-pressure chamber 112 is denoted as P4. At this time, there will be a relationship among P1, P2, P3 and P4: $P1{\approx}P2{>}P3{>}P4$. It is assumed that a sealing force exerted by the high-pressure medium on the sealing member 30 is F, and F satisfies the relationship: $F=(P2-P3){\times}S$, wherein, S is a bottom surface area of the sealing member 30.

Embodiment 2

Figure 4:
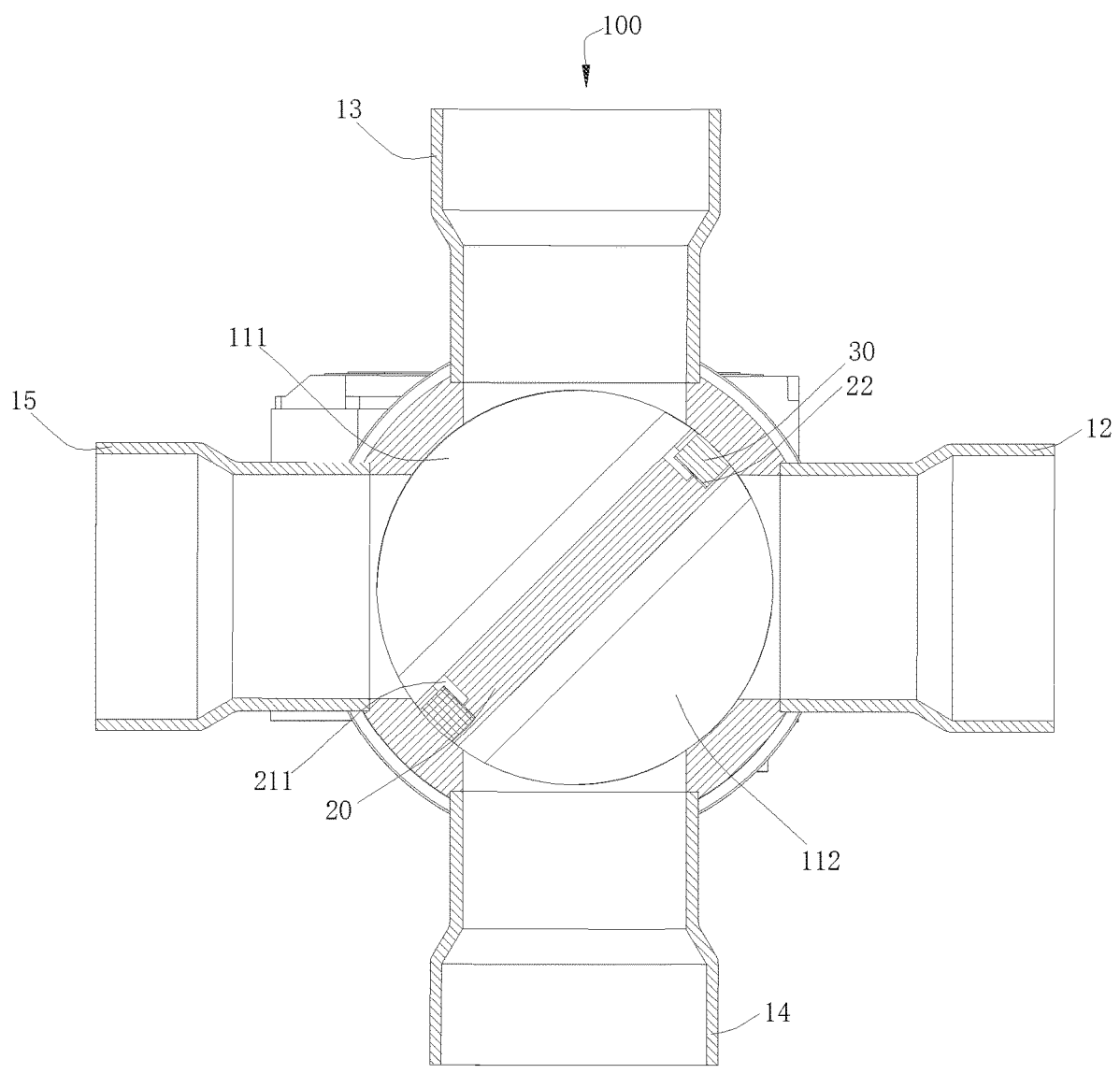
FIG. 4 is a schematic view of an air passage structure according to one or more embodiments.

Referring to FIG. 4, a structure of a four-way valve in the embodiment 2 is substantially the same as that of the four-way valve in the embodiment 1, and the same parts can be described with reference to the embodiment 1, so they will not be repeated here. The differences are as follows:

In this embodiment, two air passage structures 21 on both sides of a piston 20 are not in communication with each other, and each of the two air passage structures 21 includes a first air passage 211. The embodiment 2 is the same as the embodiment 1 in that an extension direction of the first air passage 211 is the same as the extension direction of the first air passage 211 in the embodiment 1, and both are perpendicular to an axial direction of the piston 20. However, in this embodiment, the first air passage 211 is located at a connection position between a sealing member 30 and the piston 20, and there is a gap 22 between the sealing member 30 and the piston 20, and the first air passage 211 and the gap 22 are in communication with each other.

It should be noted that a mounting groove 23 is a groove opened on both sides of the piston 20 to accommodate the sealing member 30. Since the sealing member 30 has a long shape, the mounting groove 23 has a long groove with the same size as the sealing member. When the sealing member 30 is correspondingly installed in the mounting groove 23, there will be a certain gap 22 between the sealing member 30 and a groove wall of the mounting groove 23. That is, there is the gap 22 between the sealing member 30 and the groove wall of the mounting groove 23 along an axial direction of the sealing member 30, and the gap 22 is in communication with the first air passage 211. When the high-pressure medium enters the first air passage 211, it will penetrate into the gap 22, so that pressure can be applied to any part of the sealing member 30, so that the pressure on the sealing member 30 can be equalized everywhere, avoiding a structural damage of the sealing member 30 caused by excessive stress concentration at a certain position of the sealing member 30, such as the position connected with the first air passage.

It can be understood that an ends of the first air passage 211 are respectively in communication with the gap 22 on both sides, therefore, the high-pressure medium in the a high-pressure chamber 111 directly flows to the sealing members 30 on both sides of the piston 20 through the first air passage 211, and further pressure is applied to the sealing members 30 to fit tightly against the inner wall of the valve body 10.

Specifically, the high-pressure medium in the high-pressure chamber 111 can enter into the gap 22 between the sealing member 30 and the piston 20 through the first air passage 211 in each of the air passage structures 21. Since an arrangement position of the first air passage 211 overlaps with the gap 22, when the high-pressure medium flows in the gap 22 from the first air passage 211, it can penetrate into any position of the sealing member 30 through the gap 22, therefore, the same force is applied to any position of the sealing member 30 on both sides of the piston 20, so that the sealing member 30 on both sides of the piston 20 is pressed against the inner wall of the valve body 10 with the same force. The sealing member 30 can fit tightly against the inner wall of the valve body 10, and at the same time, the pressure at both ends of the piston 20 can be equalized, which can not only prevent internal leakage, but also avoid a problem of stress concentration.

Embodiment 3

Figure 5:
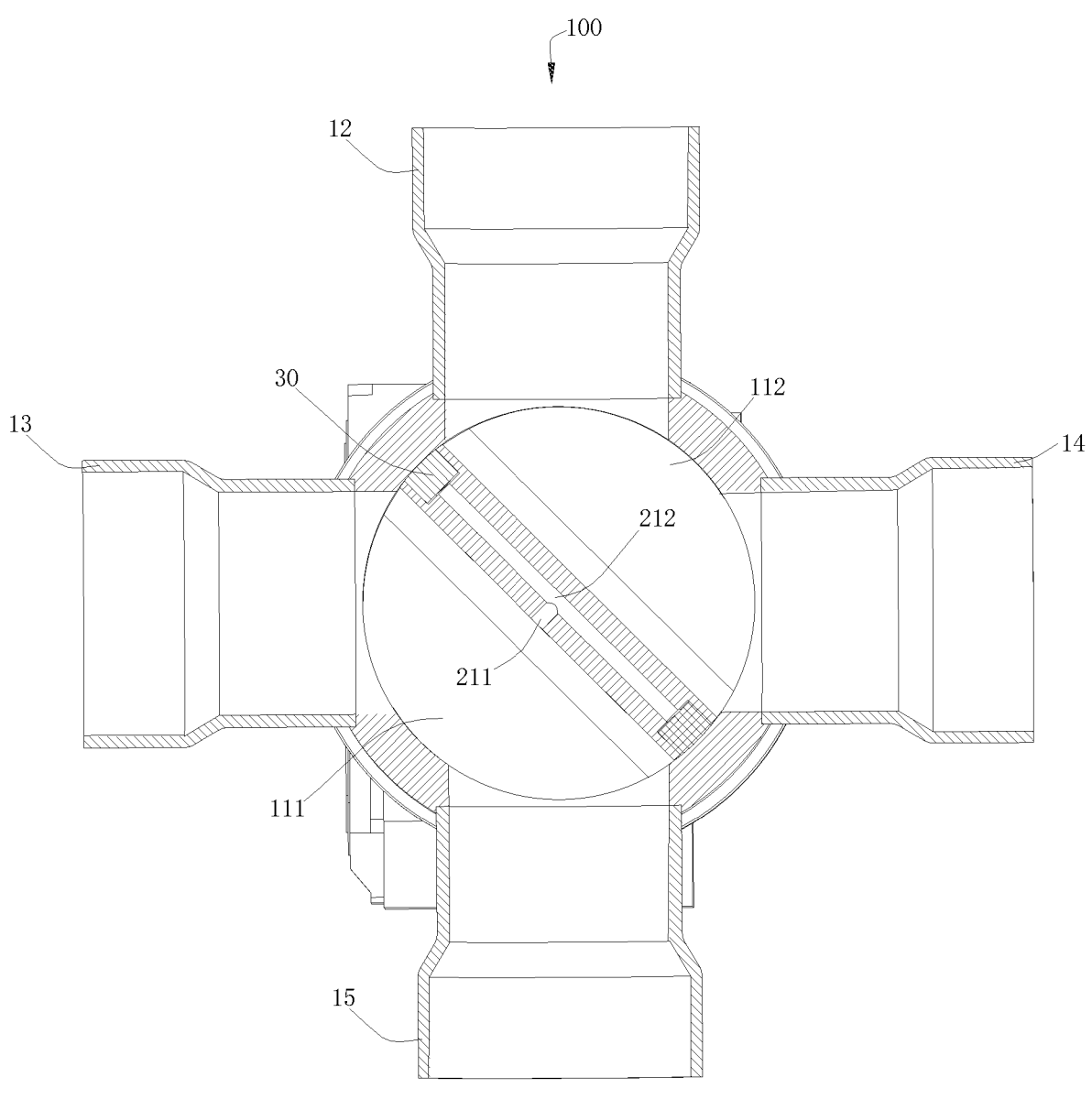
FIG. 5 is a schematic view of an air passage structure according to one or more embodiments.

Referring to FIG. 5, a structure of a four-way valve in the embodiment 3 is substantially the same as that of the four-way valves in the embodiment 1 and the embodiment 2, and the same parts can be described with reference to the embodiment 1 and the embodiment 2, so they will not be repeated here. The differences are as follows.

In this embodiment, two air passage structures 21 on both sides of a piston 20 are in communication with each other. The air passage structure 21 includes a first air passage 211 and a second air passage 212. Among them, the number of the first air passage 211 provided by the air passage structure 21 is 1. The second air passage 212 extends from a sealing member 30 on one side of the piston 20 to the sealing member 30 on the other side of the piston 20. The first air passage 211 is located in a middle portion of the air passage structure 21 on both sides of the piston 20. And one end of the first air passage 211 is in communication with a middle portion of the second air passage 212, and the other end of the first air passage 211 is in communication with a high-pressure chamber 111. And the two ends of the second air passage 212 are respectively in communication with the sealing member 30 on both sides of the piston 20.

It can be understood that both ends of the second air passage 212 are respectively in communication with the sealing member 30 on both sides of the piston 20, so that a high-pressure medium in the high-pressure chamber 111 can flow into the second air passage 212 through the first air passage 211, and can flow into the sealing member 30 at both sides of the piston 20 respectively, so that a pressure can be applied to the sealing member 30 to fit tightly against the inner wall of the valve body 10.

Specifically, the arrangement direction of the first air passage 211 is same as that of the first air passage 211 in the embodiment 1 and the embodiment 2. The arrangement direction of the second air passage 212 is same as that of the first air passage 211 in the embodiment 1. The arrangement g directions of the first air passage 211 and the setting directions of the second air passage 212 are perpendicular to each other. When the high-pressure medium in the high-pressure chamber 111 flows into the first air passage 211 in a middle position, there are two vertical inflection points between the first air passage 211 and the second air passage 212, which extend to the sealing member 30 on both sides of the piston 20. When the high-pressure medium flows to a branch between the first air passage 211 and the second air passage 212, the high-pressure medium is divided into two branches and flows to the sealing member 30 on both sides of the piston 20, and a vertical force is applied to the sealing members 30 on both sides of the piston 20, respectively, so that the sealing members 30 on both sides of the piston 20 are subjected to a same amount of pressing force toward an inner wall of the valve body 10, so that the sealing member 30 can fit tightly against the inner wall of the valve body 10, and at the same time, the pressure at both ends of the piston 20 can be equalized. In this way, not only can internal leakage be prevented, but also the problem of stress concentration can be avoided.

Embodiment 4

Figure 6:
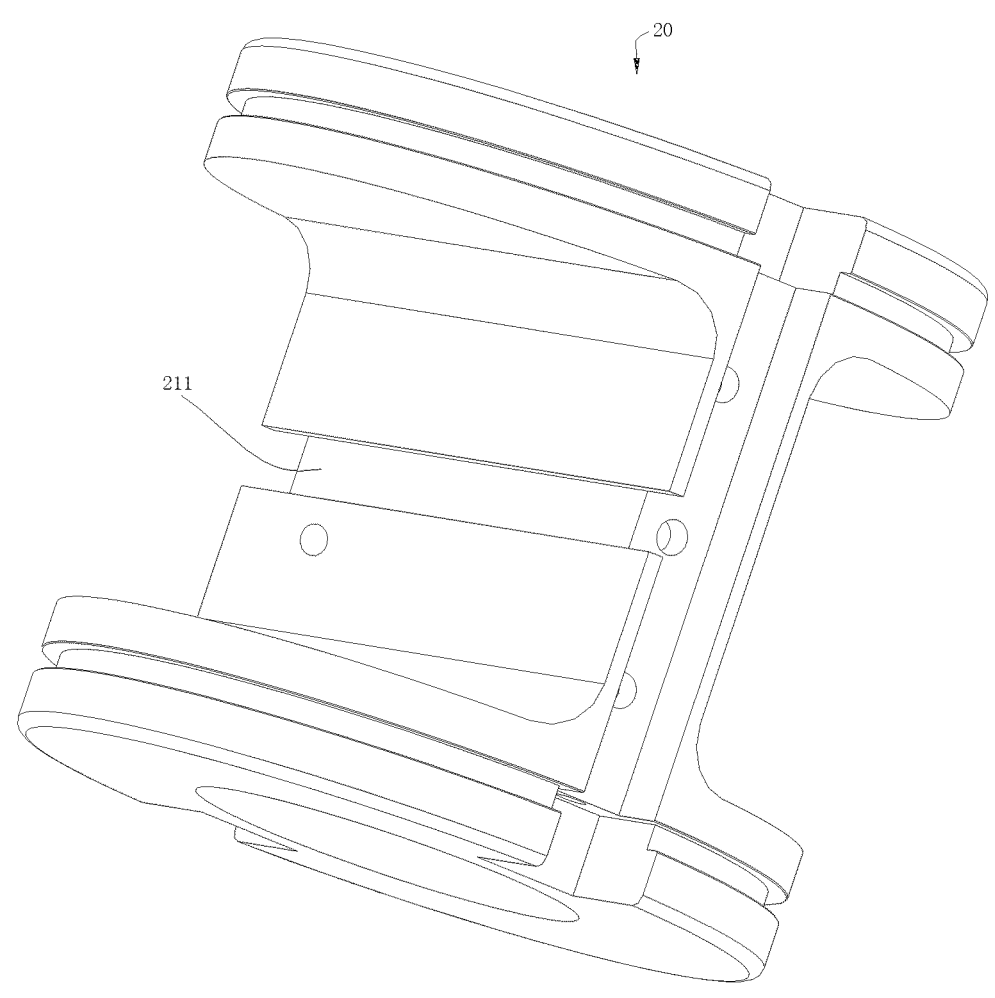
FIG. 6 is a schematic view of an air passage structure according to one or more embodiments.

Referring to FIG. 6, a structure of a four-way valve in the embodiment 4 is substantially the same as that of four-way valves of the embodiment 1, the embodiment 2 and the embodiment 3, and the same parts can be described with reference to the embodiment 1, the embodiment 2 and the embodiment 3, so they will not be repeated here. The differences are as follows.

In this embodiment, two air passage structures 21 on both sides of a piston 20 are in communication with each other. Each of the air passage structures 21 includes a first air passage 211, and the first air passage 211 extends from a sealing member 30 on one side of the piston 20 to the sealing member 30 on the other side of the piston 20. In the embodiment 3, a second air passage 212 is disposed inside the piston 20, that is, after a high-pressure medium needs to be introduced into the piston 20 through the first air passage 211, it can flow into the second air passage 212, so that the high-pressure medium can flow into the sealing member 30 on both sides of the piston 20. But in this embodiment, the first air passage 211 is directly arranged on the side of a middle long plate of the piston 20, that is, the high-pressure medium can directly flow into the first air passage 211. And a gap 22 is respectively provided between the sealing members 30 on both sides of the piston 20 and the piston 20, and both ends of the first air passage 211 can be in communication with the gap 22 on both sides of the piston 20 respectively.

It should be noted that a mounting groove 23 is a groove on both sides of the piston 20 to accommodate the sealing member 30. Since the sealing member 30 has a long shape, the mounting groove 23 has a long groove with the same size as the sealing member. When the sealing member 30 is correspondingly installed in the mounting groove 23, there will be a certain gap 22 between the sealing member 30 and a groove wall of the mounting groove 23. That is, there is the gap 22 between the sealing member 30 and the groove wall of the mounting groove 23 along an axial direction of the sealing member 30, and the gap 22 is in communication with the first air passage 211. When the high-pressure medium enters the first air passage 211, it will penetrate into the gap 22, so that pressure can be applied to any part of the sealing member 30. The pressure on the sealing member 30 can be equalized everywhere, and a damage to the structure caused by stress concentration can be avoided.

Specifically, when the high-pressure medium in a high-pressure chamber 111 directly flows into the first air passage 211 by being contact with the sidewall of the piston 20, The high-pressure medium can be directly divided into two branches to flow into the sealing member 30 on both sides of the piston 20, so that the high-pressure medium can permeate to any position of the sealing member 30 through the gap 22. Therefore, the sealing members 30 on both sides of the piston 20 are respectively applied with the same force at any position, thus the sealing members 30 on both sides of the piston 20 are subjected to the same force pressing towards the inner wall of the valve body 10. Furthermore, the sealing member 30 can fit tightly against the inner wall of the valve body 10, and at the same time, the pressure at both ends of the piston 20 can be equalized, which can not only prevent internal leakage, but also avoid the problem of stress concentration.

It should be noted that in this embodiment, the medium can be gaseous refrigerant, liquid refrigerant and gas-liquid mixed refrigerant, and the specific form of the medium is not limited here.

The four-way valve 100 provided by this present disclosure, by providing the air passage structure 21 on the piston 20 adjacent to the high-pressure chamber 111 and being in communication with the sealing member 30, therefore, the high-pressure medium in the high-pressure chamber 111 is in communication with the sealing member 30 through the air passage structure 21, thereby providing the pressure for the sealing member 30 to fit against the valve body 10, and reducing the leakage channel and improving the sealing performance.

Figure 7:
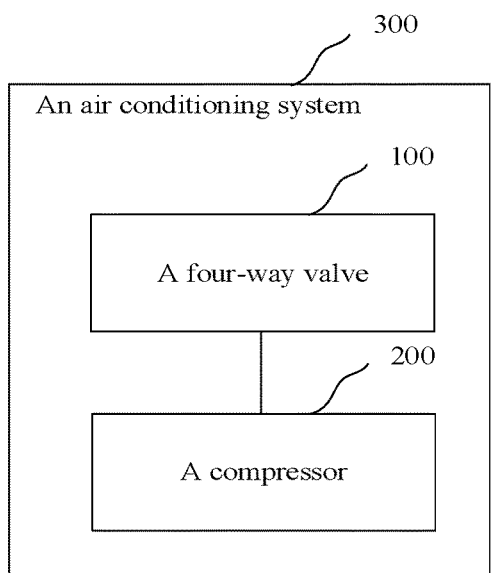
FIG. 7 is a schematic view of an air conditioning system according to one or more embodiments.

Referring to FIG. 7, the present disclosure further provides an air conditioning system 300. An air conditioning system 300 includes a compressor 200 and a four-way valve 100. The compressor 200 is connected to the four-way valve 100.

The air conditioning system 300 have the same advantages as the four-way valve 100.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present disclosure.

One of ordinary skill in the art should recognize that the above embodiments are used only to illustrate the present disclosure and are not used to limit the present disclosure, and that appropriate variations and improvements to the above embodiments fall within the protection scope of the present disclosure so long as they are made without departing from the substantial spirit of the present disclosure.

What is claimed is:

1. A four-way valve comprising a valve body, a piston and two sealing members, the valve body having a valve cavity, the piston being movably disposed in the valve cavity, the two sealing members being disposed on the piston and at least a part of each of the two sealing members being capable of abutting against an inner wall of the valve cavity;
   wherein the valve cavity is separated into a high-pressure chamber and a low-pressure chamber by the piston, the high-pressure chamber and the low-pressure chamber are mutually independent;
   the piston is provided with only one first air passage, and the first air passage is in communication with the two sealing members and in communication with the high-pressure chamber, and a high-pressure medium in the high-pressure chamber is capable of pressing the two sealing members against the inner wall of the valve cavity through the first air passage;
   two gaps are formed between the piston and the two sealing members on both sides of the piston correspondingly, the gap extends in an axial direction of the valve body, and two ends of the first air passage are both directly in communication with the two gaps; and
   the first air passage extends from a sealing member on one side of the piston to the sealing member on the other side of the piston.

2. The four-way valve of claim 1, wherein the two sealing members are symmetrically provided on both sides of the piston, and the first air passage is in communication with the two sealing members and symmetrically provided on both sides of the piston relative to an axial direction of the piston.

3. The four-way valve of claim 1, wherein a mounting groove is provided on both sides of the piston and the sealing member is movably disposed in the mounting groove.

4. The four-way valve of claim 3, wherein an elastic member is provided between the sealing member and the piston, the elastic member is disposed within the mounting groove, and the elastic member is capable of providing a resilient force to the sealing member for movement toward an inner wall of the valve body.

5. An air conditioning system comprising a compressor and a four-way valve of claim 1.

* * * * *